(12) United States Patent
Sridhar et al.

(10) Patent No.: US 7,149,795 B2
(45) Date of Patent: Dec. 12, 2006

(54) DISTRIBUTED QUALITY-OF-SERVICE SYSTEM

(75) Inventors: Manickam R. Sridhar, Holliston, MA (US); Geoff Steckel, Newton Lower Falls, MA (US)

(73) Assignee: Converged Access, Inc., Littleton, MA (US)

( * ) Notice: Subject to any disclaimer, the term of this patent is extended or adjusted under 35 U.S.C. 154(b) by 818 days.

(21) Appl. No.: 09/955,860

(22) Filed: Sep. 18, 2001

(65) Prior Publication Data

US 2002/0073226 A1    Jun. 13, 2002

Related U.S. Application Data

(60) Provisional application No. 60/233,364, filed on Sep. 18, 2000.

(51) Int. Cl.
*G06F 15/173* (2006.01)
(52) U.S. Cl. .................. 709/223; 709/220; 709/250; 714/13
(58) Field of Classification Search ................ 709/223, 709/233, 238, 220, 250; 714/13
See application file for complete search history.

(56) References Cited

U.S. PATENT DOCUMENTS

| | | | |
|---|---|---|---|
| 5,581,544 A | 12/1996 | Hamada et al. | |
| 5,825,772 A * | 10/1998 | Dobbins et al. | 370/396 |
| 5,878,029 A * | 3/1999 | Hasegawa et al. | 370/236 |
| 6,098,108 A | 8/2000 | Sridhar et al. | |
| 6,111,881 A | 8/2000 | Soncodi | |
| 6,574,195 B1 * | 6/2003 | Roberts | 370/235 |
| 6,628,649 B1 * | 9/2003 | Raj et al. | 370/360 |
| 6,683,884 B1 * | 1/2004 | Howard | 370/412 |
| 6,741,585 B1 * | 5/2004 | Munoz et al. | 370/352 |

* cited by examiner

*Primary Examiner*—Rupal Dharia
*Assistant Examiner*—Nghi V. Tran
(74) *Attorney, Agent, or Firm*—Fish & Richardson P.C.

(57) ABSTRACT

A distributed quality-of-service system makes use of a distributed architecture to achieve very high throughput and availability in which a number of separate processors are loosely coupled in a scalable communication architecture. The computational load required to implement an approach that is similar to that of Floyd and Jacobson is distributed among the processors without requiring the processors to be tightly coupled. A high data rate flow is split so that each processor receives a portion of the traffic passing through the system. The processors implement separate class-based queuing and link fairness algorithms. The output flows of each of the processors are combined to form the overall output flow. The processors exchange data from time to time in order to achieve an approximate link fairness on the overall output flow without requiring the separate algorithms implemented on each of the processors to be tightly coupled.

8 Claims, 9 Drawing Sheets

DISTRIBUTED QUALITY-OF-SERVICE SYSTEM

CLAIM OF PRIORITY

This application claims priority under 35 USC §119(e) to U.S. patent application Ser. No. 60/233,364, filed on Sep. 18, 2000, the entire contents of which are hereby incorporated by reference.

TECHNICAL FIELD

This invention relates to computer networking, and more particularly to distributed quality-of-service systems.

BACKGROUND

This invention relates to a distributed system for providing quality-of-service communication services.

It is often desirable to provide different priorities and data rate (bandwidth) guarantees to different classes of data flows that share a limited capacity communication link. For example, some data flows, such as real-time audio or multimedia streams may require a guaranteed data rates and low latency, while other flows, such as bulk data transfers may not have such requirements. It may also be desirable to provide bandwidth guarantees to an aggregation of data flows within a particular class, rather than simply providing guarantees to individual flows. For example, on a particular link, bulk data transfers as an aggregate may have a minimum data rate.

A particular approach to link sharing based on a class hierarchy, and a priority, a guaranteed data rate, and a burst (maximum) data rate for each class is discussed in S. Floyd and V. Jacobson, "Link-Sharing and Resource Management Models for Packet Networks," IEEE/ACM Transactions of Networking, Vol. 3(4), Aug. 1995. That paper describes an implementation of a packet-scheduling algorithm that scales as N-squared where N is the number of classes. This implementation provides class-based queuing as well as link fairness based on providing guaranteed data rates to classes, and allowing classes to, "borrow" data rate from idle classes to reach their maximum data rates.

Another area of recent development and standardization relates to trunking, or link aggregation, to achieve point-to-point communication capacity that combines the capacity of multiple physical links. The IEEE 802.3ad standard specifies how parallel Ethernet links are aggregated to appear as a single logical link. A link aggregation control protocol is used to distribute packets to the physical links and then collect the packets from the physical links to recreate a single flow. Commercial switches and routers are available that include multiple 100 Mb/s Ethernet links that are aggregated according to the IEEE standard.

SUMMARY

At very high data rates, for instance at 100 Mb/s and above, implementation of the scheduling algorithm described by Floyd and Jacobson may not be feasible or require computation resources that are not cost-effective. This is particularly true if the number of classes grows very large, such as when individual data flows are treated as separate classes. If each data flow is treated as a separate class, it is not unreasonable to expect that N=10000 classes could share a single communication link. Furthermore, a centralized implementation of such an algorithm may require substantial computation resources.

In a general aspect, the invention is a system that makes use of a distributed architecture to achieve very high throughput and availability. A number of separate processors are loosely coupled in a scalable communication architecture. The computational load required to implement an approach that is similar to that of Floyd and Jacobson is distributed among the processors without requiring the processors to be tightly coupled. A high data rate flow is split so that each processor receives a portion of the traffic passing through the system. The processors implement separate class-based queuing and link fairness algorithms. The output flows of each of the processors are combined to form the overall output flow. The processors exchange data from time to time in order to achieve an approximate link fairness on the overall output flow without requiring the separate algorithms implemented on each of the processors to be tightly coupled.

In general, in another aspect, the invention is a communication system for implementing an overall communication policy. The system includes a first interface for accepting separate communication links forming a first trunked communication link, as well as a second communication interface for accepting a second set of communication links forming a second trunked communication link. The system also includes processors coupled to corresponding different ones of the first communication links. The processors are also coupled to corresponding different ones of the second communication links, and coupled to one another over a communication channel. Each processor is configured to implement a separate communication policy for data passing between the first trunked communication link and a corresponding one of the second communication links. Together the separate communication policies approximate the overall communication policy. The processors are further configured to communicate among one another to adjust the separate communication policies to adapt to data flows passing through the processors.

Preferred embodiments include the following. Adapting to data flows may include a first processor borrowing bandwidth from a second processor. Each processor in the plurality of processors may have a copy of each communication policy in the communication system, communicating with the other processors to keep state information current for each such copy. The processors may be divided into active processors and standby processors, such that each active processor actively implements a communication policy on data, while a standby processor monitors the active processors for a failure on an active processor. Upon detecting the failure, the standby processor may join active processors, thus implementing the overall communication policy.

Each processor in the plurality of processors may mirror state information for reporting across the communication system. Each processor in the plurality of processors may mirror state information for management across the communication system.

The overall communication policy may be implemented only for traffic traveling from the first interface to the second communication interface. The overall communication policy may be implemented for traffic traveling between the first interface and the second communication interface in either direction.

In general, in yet another aspect, the invention is a communication system for implementing a communication policy. The system includes a first communication link, a second communication link, and a first processor coupled to the first and second communication links, configured to implement the communication policy for data passing between the first communication link and the second communication link. The system also includes a second processor coupled to the first and second communication links, where the second processor is in communication with the first processor to maintain a mirror configuration on the second processor to implement the communication policy in a standby status relative to the first processor. Additionally, the first processor implements the communication policy until the second processor detects a failure in the first processor, at which time the second processor implements the communication policy.

Preferred embodiments include the following. In response to the failure in the first processor, the first processor may place itself in a standby status relative to the second processor.

In general, in still another aspect, the invention is a communication system for implementing an overall communication policy, including a first communication link and a second communication link. The system also includes processors configured to implement the communication policy for data passing between the first communication link and the second communication link. The system further includes aggregator/disaggregator network devices in a first group arranged between the processors and the first communication link, as well as aggregator/disaggregator network devices in a second group arranged between the processors and the second communication link. Additionally, the system includes a first mesh, which has network links joining each processor to each aggregator/disaggregator in the first group, and a second mesh, which has network links joining each processor to each aggregator/disaggregator in the second group. Each processor is configured to implement a separate communication policy for data passing between the first communication link (via an aggregator/disaggregator in the first group) and the second communication link (via a corresponding aggregator/disaggregator in the second group). Together the separate quality-of-service policies approximate the overall communication policy. The processors are further configured to communicate among one another to adjust the separate communication policies to adapt to data flows passing through the processors.

Preferred embodiments include the following. Each processor may have a copy of each communication policy in the communication system and communicate with the other processors to keep state information current for each such copy. The processors may be divided into active processors and standby processors, such that each active processor actively implements a communication policy on data, while a standby processor monitors the active processors for a failure on an active processor. Upon detecting the failure, the standby processor may join active processors, thus implementing the overall communication policy.

In general, in yet still another aspect, the invention is a computer-based method for scheduling network packet traffic for transmission according to a class-based queuing hierarchy. The method includes creating a fixed size matrix. One dimension of the matrix represents a class priorities. Another dimension of the matrix represents levels corresponding to levels of the hierarchy. Cells in the matrix include collections of references to nodes in the hierarchy. The method includes accepting a collection of class-based queues containing a plurality of packets awaiting transmission. The method further includes scheduling a next packet for transmission. The scheduling includes searching cells of the matrix for a reference to a next class in the hierarchy, the next class being associated with the next packet, such that the worst-case time of the searching is bounded by a finite time dependent on the fixed size of the matrix.

An advantage of the invention is that very high throughput, for instance 100 Mb/s per processor can be achieved using relatively inexpensive processors. For instance, a two-processor system can achieve an aggregate throughput approaching 200 Mb/s, which exceeds the 155 Mb/s, the capacity of an OC3 communication link. Similarly, a 20-processor system can achieve an aggregate throughput approaching 2 Gbps, which is approximately the capacity of an OC48 communication link.

Another advantage of the invention is that high availability is achieved through the loose coupling of the processors. If one processor fails, the other processors adapt to the lost processor without having to be restarted. Since the processors do not have to be tightly coupled, the hardware complexity is reduced yielding lower cost and higher reliability.

Another advantage of the invention is that a high-rate flow can be distributed among processors, for example using an Ethernet 802.3ad link aggregator, without regard to their content or addresses. That is, a link aggregator can distribute packets to the different processors without regard to the classes of flows or the particular flows to which those packets belong. This simplifies processing of the distribution process.

Another advantage of the invention is that the approach to scheduling network packet traffic for transmission is efficient relative to approaches that traverse the class-based queuing hierarchy to select packets for transmission.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
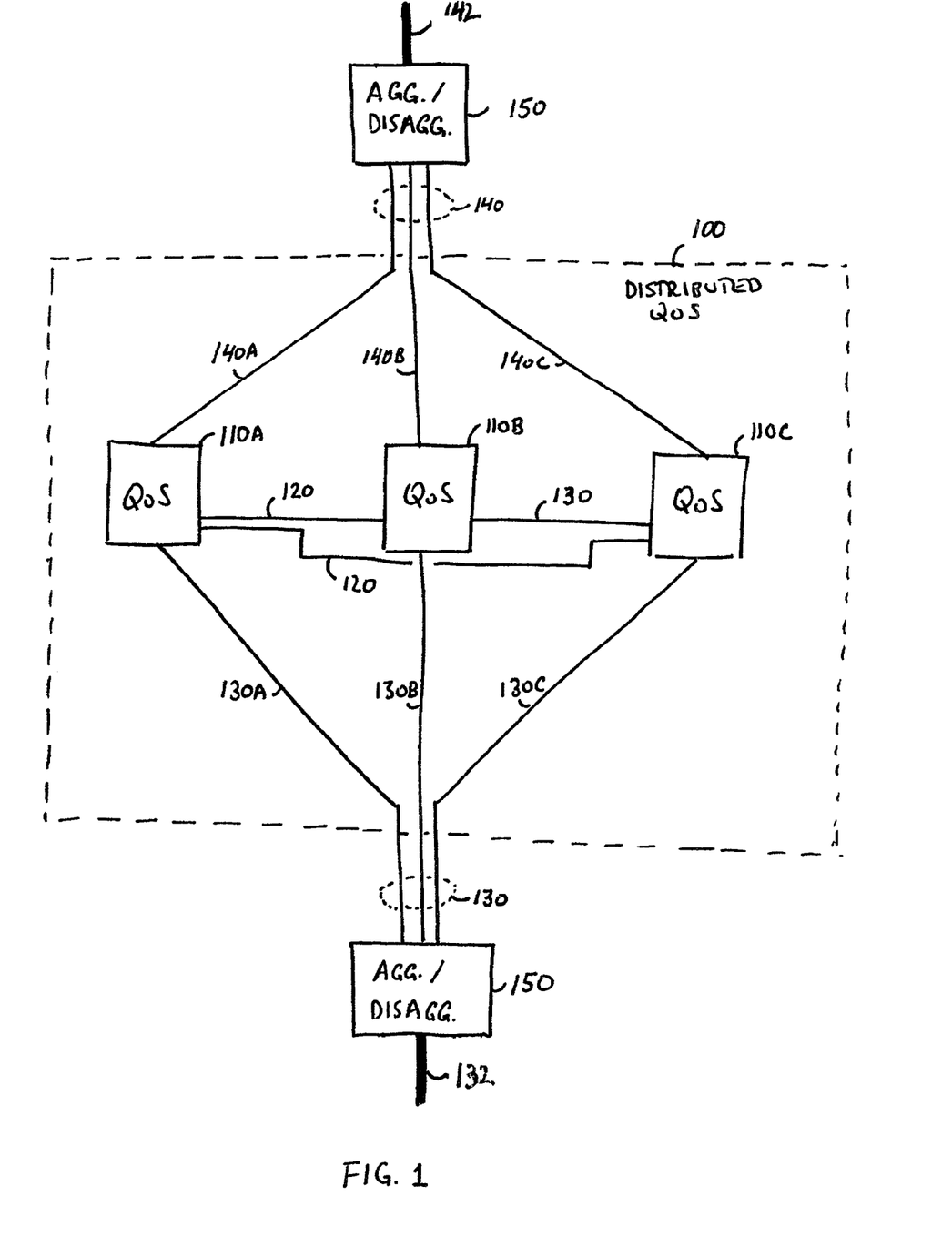
FIG. 1 is a block diagram of a distributed quality-of-service system.

Referring to FIG. 1, according to this invention, a distributed QoS (Quality-of-Service) system 100 implements a communication policy that affect data flows passing between data links 132 and 142. In this embodiment, distributed QoS system 100 implements class-based queuing and link fairness algorithms. QoS system 100 is on a communication access path from a local area network to a wide area network, for example on the communication access path joining a corporate network and the Internet. QoS system 100 implements a communication policy that determines how the communication resources on the access path are divided between different inbound or outbound flows. For simplicity of explanation, the discussion below concentrates on flows entering QoS system 100 over link 132 and leaving over link 142, such as flows leaving a local area network over an access path to a wide area network. In general, QoS system 100 implements policies on flows passing from the wide area network to the local area network as well.

Example flows include layer three network traffic having a source address and a destination address, such as IP traffic. Flows can also include layer four protocols such as TCP and UDP, as well as higher-level application protocols.

QoS system 100 acts as an Ethernet bridge that has a connection for each of two sets of trunked communication links, trunked Ethernet link 130 and trunked Ethernet link 140. Unlike a router, which has a network layer address associated with each connection, QoS system 100 does not necessarily have a network layer address that is "visible" to other computers. Trunked Ethernet links 130 and 140 adhere to the IEEE 802.3ad link aggregation standard. Each physical link provides a communication capacity of 100 Mb/s. In a typical use of QoS system 100, an aggregation/disaggregation device is coupled to each of the trunked links to pass communication between the separate trunked physical links and a high capacity physical link. One aggregation/disaggregation device 150 passes communication between a high-capacity link 132 and trunked link 130, while another aggregation/disaggregation device 150 passes communication between trunked link 140 and high-capacity link 142. Aggregation/disaggregation devices 150 can be routers, switches, or other devices that conform to the 802.3ad standard.

Internally, QoS system 100 includes a number of loosely coupled QoS processors 110A–110C. As illustrated in FIG. 1, QoS processors 110 are each coupled to a different one of the physical links of trunked link 130 and trunked link 140. In this embodiment, each QoS processor 110 is implemented as a separate computer, which runs a copy of the same software as the other QoS processors 110. QoS processors 110 are peers without the necessity of identifying any as a "master" or controlling processor. QoS processors 110 are coupled to one another over communication links 120. QoS system 100 uses a multiple access network.

QoS processors 110 cooperate to make QoS system 100 appear as a single entity to devices outside QoS system 100. For example, QoS processors 110 cooperate to implement the 802.3ad protocol including functions such as establishing communication with aggregation/disaggregation devices 150.

Packet Handling

Aggregation/disaggregation device 150 distributes Ethernet packets arriving over high-capacity link 132 among physical Ethernet links 130 without considering Internet Protocol (IP) layer 3 addressing, or higher layer information such as the content (payload) of one or more packets of any data flow. If this distribution is random, one would expect that each class would be distributed in the long term in equal proportions to each of QoS processors 110. One approach to providing class-based queuing and link fairness is to allocate equal shares of the capacity of outbound high-capacity link 142 to each of the QoS processors for that processor to manage separately. In shorter-term intervals, there may be situations in which particular classes may not be distributed uniformly and as a result may not receive a globally fair share of the capacity of high-speed link 142.

For some data flows, it is desirable that a single QoS processor 110 handles all packets for a particular flow. For instance, some flows require in-order delivery of packets. If multiple QoS processors 110 were to handle the flow, each QoS processor 110 could introduce a different queuing delay for packets passing through it, so the order of packets could be changed. In this embodiment, such flows are passed through a single QoS processor 110 through a redirection process. When a QoS processor 110 receives a packet for a flow that it is not handling, it redirects the packet to the appropriate other QoS processor 110 over one of communication links 120. The receiving QoS processor 110 processes the packet and then passes it out of QoS system 100 over physical link 140 that couples receiving QoS processor 110 to aggregator/disaggregator 150. For example, a packet can be sent to QoS system 100 over physical link 130A, pass over communication link 120 between QoS processor 110A to QoS processor 110C, and pass from QoS system 100 over physical link 140C.

Also in some embodiments, QoS system 100 performs additional processing on data flows. This processing can include caching of content, encryption and compression of flows, flow multiplexing and tunneling, and proxy servicing. These processing of flows typically require maintaining state between the processing of individual packets in the flows. As with flows that require in-order processing, a data flow that requires maintaining state between processing of individual packets is redirected to a particular processor.

Rebalancing

Note that as a result of assigning some data flows to particular processors the short-term statistical distribution of flows between QoS processors may be "unbalanced" such that an approach of assigning an equal proportion of the capacity to each QoS processor 110 may not be globally fair. For example, if a single high priority flow (for example one associated with a long duration multimedia stream) were assigned to one processor, say QoS processor 110A, and all other flows had lower priority, the single high-priority stream would receive no more than ⅓ of the assigned capacity for that stream, given three QoS processors 110. In order to maintain an approximate fairness regardless of where particular flows are processed, QoS processors 110 exchange messages in order to "rebalance" their allocation of the capacity of the outbound communication link. As described below, this rebalancing is performed on a class-by-class basis based on the balance of past and expected demand by in that class across the different QoS processors. Control information needed to coordinate this rebalancing is passed between QoS processor 110 over communication links 120.

Logical Processing Modules

Figure 2:
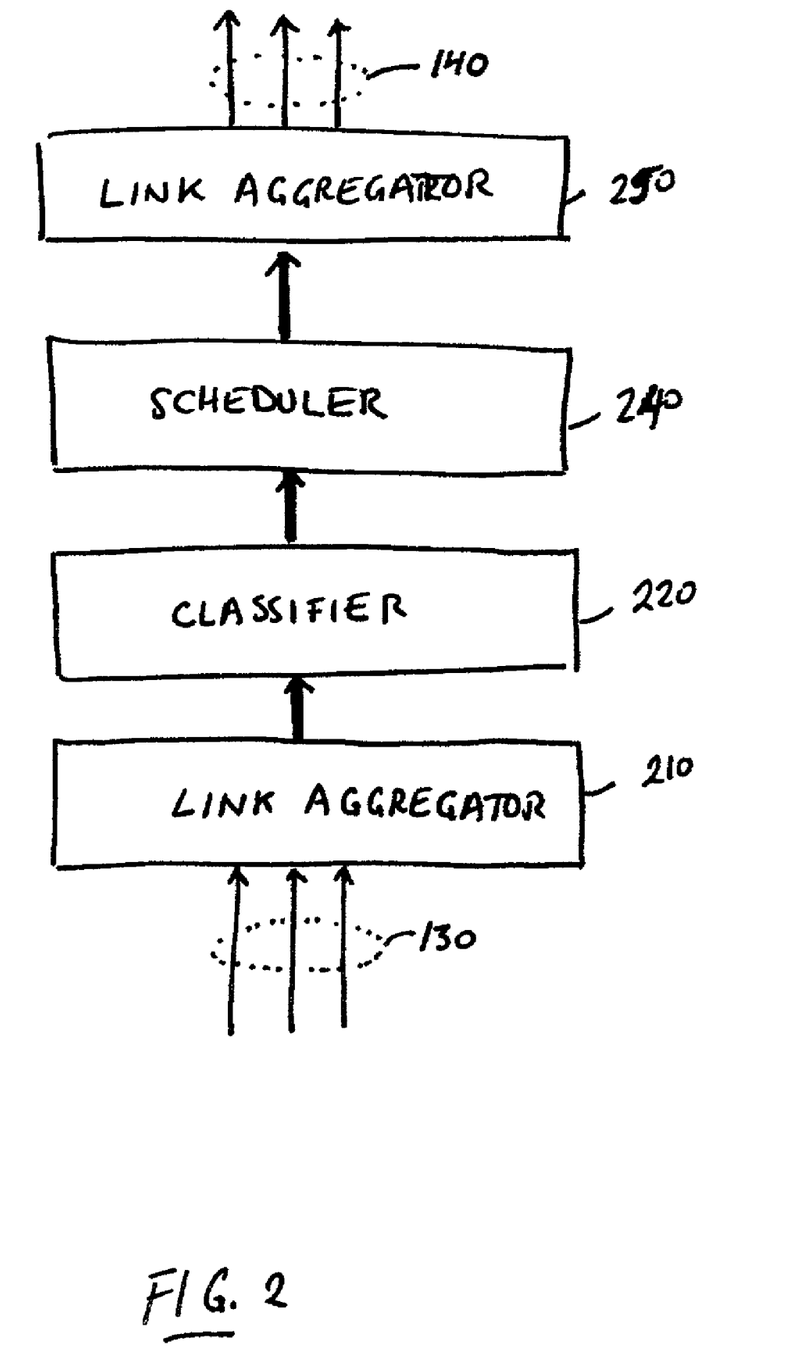
FIG. 2 is a block diagram illustrating overall processing of outbound data flows.

Referring to FIG. 2, from the point of view of the overall QoS system 100, processing of packets passing from trunked link 130 to trunked link 140 passes through several stages encoded as logical processing modules. First, link aggregator 210 provides a standard interface to trunked links 130. The packets of the overall logical flow pass to classifier 220. Classifier 220 makes use of layer 4 information, as well as in some instances layer 7 information (content of the data flow itself) to assign a data flow class to each packet. Scheduler 240 implements a class-based queuing and link fairness algorithm. Scheduler 240 passes packets scheduled for outbound link to link aggregator 250, which passes outbound packets over the different links of trunked link 140.

Figure 3:
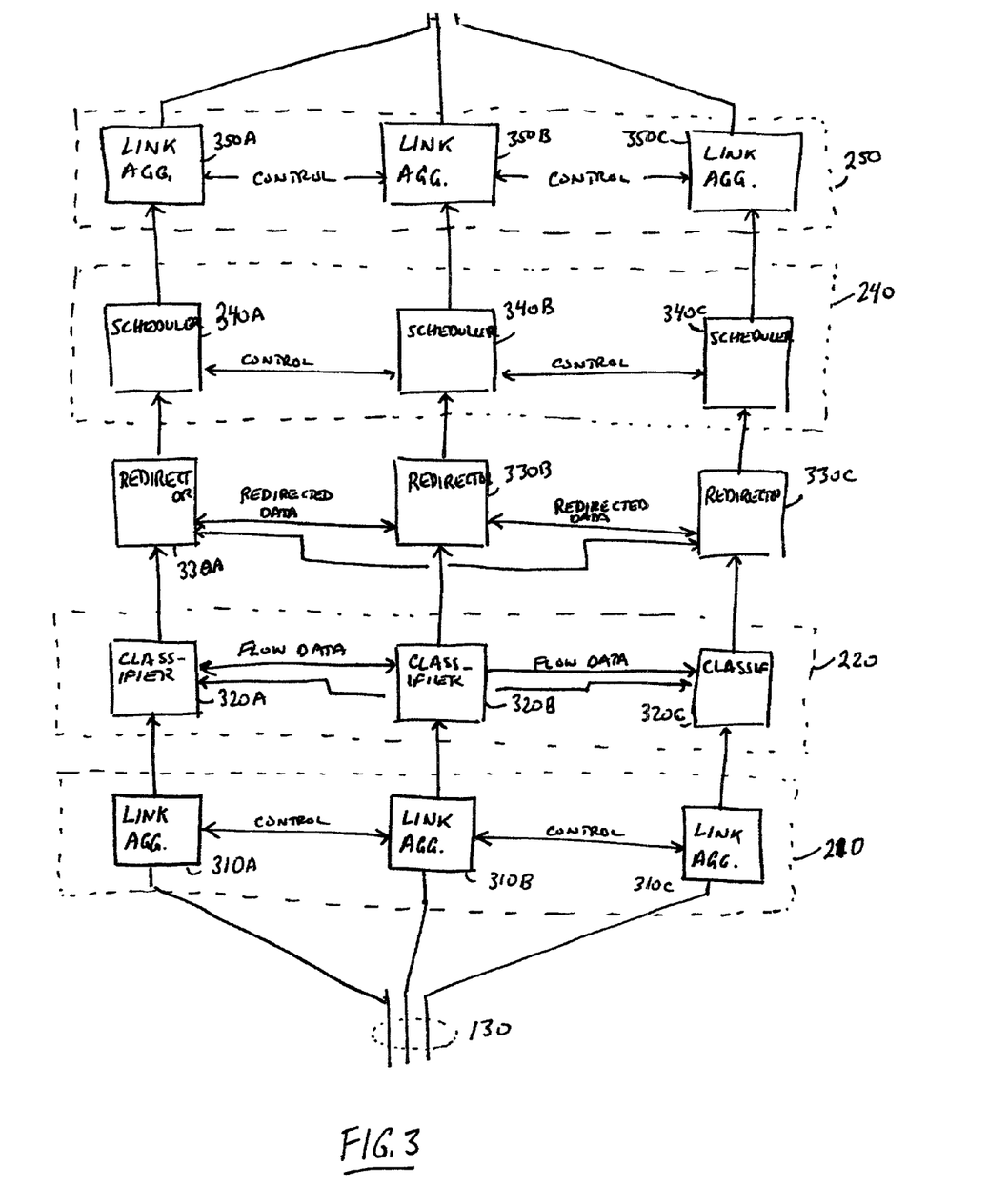
FIG. 3 is a block diagram illustration processing of outbound data flows as distributed among different processors.

Referring to FIG. 3, the logical processing modules illustrated in FIG. 2 are distributed among the separate QoS processors 110. Each processing stage is essentially distributed among the QoS processors 110. In certain of these stages, QoS processors 110 cooperate.

Link Aggregator Module

Each QoS processor 110 hosts a separate link aggregator module 310. These modules exchange control information, for instance during initial setup. In operation, little or no communication is requires between link aggregator modules 310. For example, using the configuration shown in FIG. 3, when link aggregator module 310A receives an Ethernet packet over physical link 130A, it passes that packet on to a classifier 320A without requiring interaction with the other link aggregator modules 310B and 310C.

Classifier and Redirector Modules

Each QoS processor 110 hosts a separate identical copy of classifier 320. Classifier 320 associates each input packet with a class. When classifier 320 identifies a new flow, where the new flow is to be associated with a particular class, classifier modules 320 exchange information specifying the association. Each classifier module 320 passes classifier control packets to a corresponding redirector module 330. Redirector modules 330 implement the packet exchange described above when a flow is associated with a particular QoS processor 110. Note that in general, most packets do not have to be redirected to another QoS processor 110, and redirector 330 passes such a packet directly to a corresponding scheduler module 340. Also, if a first redirector module 330 receives a packet from another redirector module 330, first redirector module 330 passes the packet to its corresponding scheduler module 340.

Scheduler Module

Scheduler modules 340 implement separate copies of a class-based queuing and link fairness algorithm. That is, each scheduler module 340 has separate queues for the various classes of data queues. If these schedulers were completely independent and were responsible for managing equal portions of the capacity of the outbound link, they would not need to communicate, at the possible expense of not achieving global fairness between flows handled in different QoS processors 110. Therefore, scheduler modules 340 exchange control information from time to time to balance their use of the outbound link. The implementation of scheduling modules 340 and the exchange of control information between them is described further below.

Finally, each scheduler module 340 passes scheduled packets to a corresponding link aggregator module 350, which passes the packets over trunked link 140 according to the appropriate link aggregation protocol.

Scheduling Algorithm

Figure 4A:
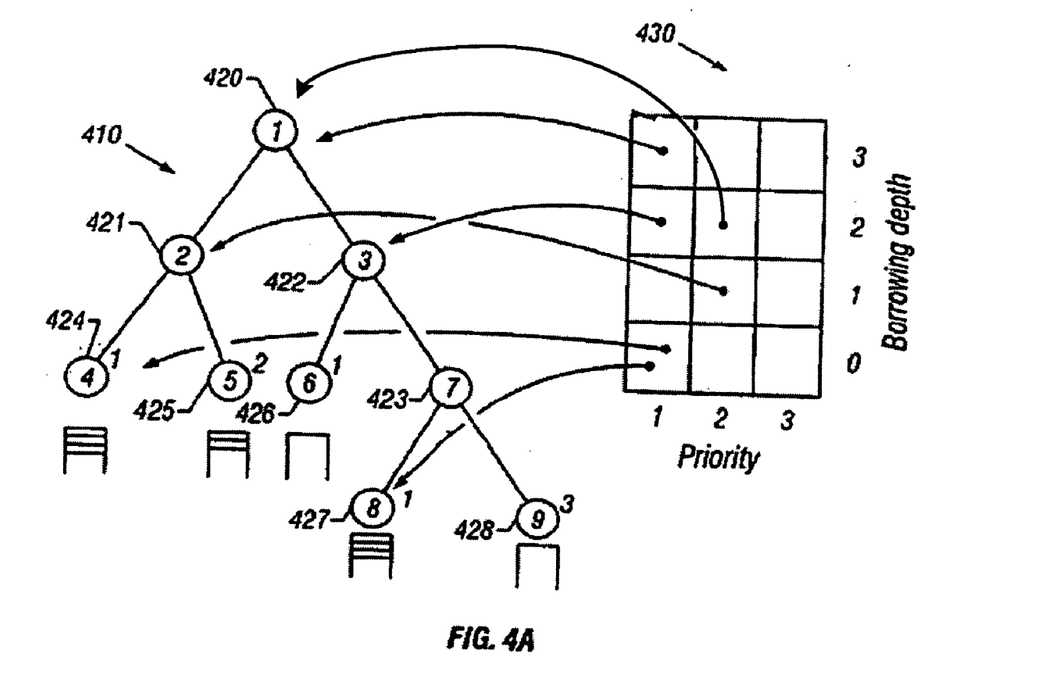
FIGS. 4A–B are diagrams that illustrate a class hierarchy and associated data structures.
Figure 4B:
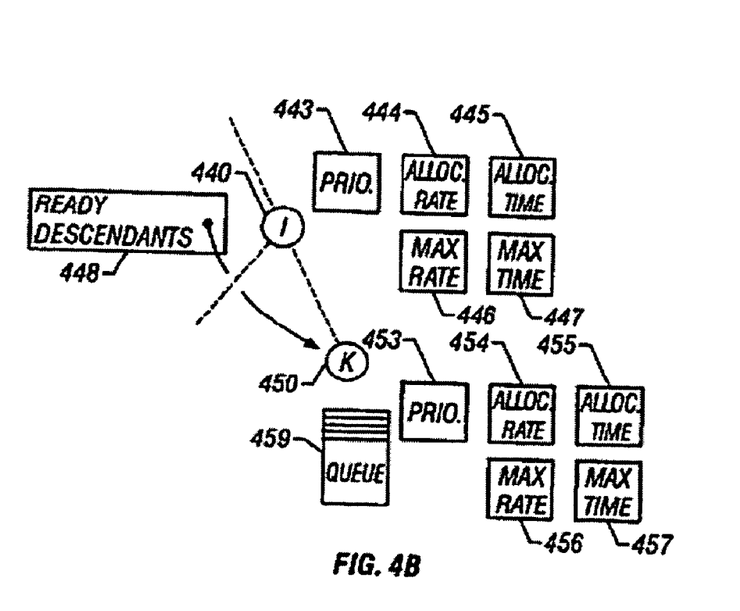

Scheduler 240 logically implements a scheduling algorithm that is distributed among scheduler modules 340 (shown in FIG. 3) in the distributed architecture of QoS system 100. FIGS. 4A-B view the scheduling processes from a centralized view as is logically implemented in scheduler 240. Referring to FIG. 4A, a class hierarchy 410 includes a root node 420, a number of intermediate nodes 421–423, and a number of leaf nodes 424–428. Referring to FIG. 4B, a typical leaf node 450 for a class k is associated with a queue 459 of packets that have not yet been scheduled for transmission. Class k is associated with a numerical priority 453. Class k has an allocated communication rate ("allocated rate") 454 and a maximum rate 456. Priority 453 and allocated and maximum communication rates 454 and 456 are fixed for a particular communication policy, though the policy itself can change. According to this implementation of the scheduling algorithm, class k has an associated next transmission time ("allocated time") 455 at which it may next transmit within its allocated rate, and a next transmission time ("maximum time") 457 at which it may next transmit within its maximum transmission rate. When scheduler 240 transmits a packet for that class, next transmit times 455 and 457 are incremented according to the size of the transmitted packet divided by the rate.

Borrowing

Scheduling proceeds generally as follows. A packet for transmission is scheduled for transmission such that higher priority classes are scheduled first. (The highest priority has priority index 1, the next-highest priority has priority index 2, and so forth.) For a particular priority of classes, only classes for which the current time has exceeded the next transmission time for their allocated rate are scheduled. Next, classes at each priority for which the current time has exceeded the next transmission time within their maximum rate are scheduled, according to a "borrowing" ordering. Borrowing is considered at each level or depth in the defined hierarchy of classes, starting at the level closest to the leaf or bottom of the class hierarchy and proceeding level by level to the single root class. Each priority is serviced in turn at each level.

Referring to FIG. 4B, an intermediate node 440 is the parent of node 450 associated with class k. Intermediate node 440 is associated with an aggregate class i of which class k is a member. Class i is associated with an allocated rate 444 and a maximum rate 446. If class k has exceeded its allocated rate, but not its maximum rate, and its parent class i has not exceeded its maximum rate, then class k may "borrow" rate from its parent. After all borrowing at all priorities have been considered at a borrowing level i, then all classes at the next level i+1 are considered starting at the highest priority. An algorithm for this type of scheduling is presented in the Floyd and Jacobson paper referenced above. However, in that paper, the approach to determining which class should be scheduled next scales in complexity as the square of the number of classes, which may be prohibitive with a large number of classes.

Next Transmitted Class

Scheduler 240 determines which class should be transmitted next by using auxiliary data structures to reduce the amount of processing required. The auxiliary data structures contain references to all classes that have packets to send or have (recursively) descendants that may borrow from them and have packets to send. These classes are called "active". Classes that have no packets to send and no borrowing descendants with packets to send are not entered in these data structures.

Scheduler 240 contains references to all active classes that have available allocated time. Scheduler 240 also contains references to all active classes whose allocated time has expired. Each class contains references to all immediate active descendant classes whose allocated time has expired.

Scheduler 240 maintains array 430, which has one column per priority and one row per depth of borrowing. A zero depth of borrowing corresponds to no borrowing, that is, to transmission within an allocated rate. A depth of one corresponds to borrowing from a parent class. The entry at priority 1 and depth 0 has a set of identifiers of priority 1 classes for which there are packets queued and the time for next transmission within the allocated rate for that class has passed, that is, that class could transmit within its allocated rate. In FIG. 4A, classes 4 and 8 (nodes 424 and 427) are such classes. In general, an entry at priority p and depth d includes identifiers of intermediate nodes such that: (a) that node has a d-level child of priority p which is a leaf node in the tree with pending packets; (b) the identified node can transmit within its allocated rate; and (c) all nodes on the branch from the identified node to the d-level child can transmit within their maximum rates. Note that, in general, the identified node may have a number of such d-level children that satisfy these criteria. A non-leaf node will be entered at several priorities if it has d-level children at different priorities that may transmit within their maximum rates.

If array 430 is maintained according to the definitions of the entries defined above, scheduler 240 identifies the next class to be scheduled by considering the entries in array 430 for priority 1/depth 0 first, then priority 2/depth 0, and so forth until scheduler 240 finds a non-empty entry. When scheduler 240 finds a non-empty entry, scheduler 240 chooses one of the identified classes in a fair manner. If all entries at depth 0 are empty, the search proceeds with priority 1/depth 1 and so forth.

If scheduler 240 identifies a depth 0 class by this procedure, then a packet from that class's queue is scheduled. If an intermediate class is identified, then an appropriate leaf class must be selected. In order to avoid searching the sub-tree of classes below that intermediate node, scheduler 240 maintains for each intermediate node a list of "ready" descendants that can transmit by borrowing from that intermediate node.

When a new packet for a class arrives at scheduler 240, if there are already packets queued for that class, then no further processing is needed. If the packet is the only packet queued for that class, scheduler 240 can add it to array 430 as follows. If the class can transmit within its allocated rate, it is added to the appropriate depth 0 entry depending on the priority of the class. Otherwise, scheduler 240 proceeds as follows. If the class can borrow from its immediate ancestor, it is added to the ancestor's list of active descendants at the leaf's priority p. Each ancestor class which can be borrowed from is considered. This procedure stops when a class is considered which (a) is on a queue, or (b) cannot be borrowed from, or (c) is entered on the scheduler 430 at this time, or (d) the root class is reached.

After a packet is transmitted for a class, if that transmission empties the queue for that class, it is removed from any entries in array 430 in which it is identified and from any ancestor class lists. If that operation empties the ancestor's list, the ancestor is removed from its ancestor's list and removed from array 430 or the timer structure (not shown) if present. The next time for transmission for that class, as well as for all classes up the class hierarchy to the root class are updated by incrementing by the packet size, divided by the allocated rate for the particular class in the tree. That is, the next transmission time is incremented by different amounts at different nodes. If at any of the nodes this increment results in a next transmission time within an allocated rate that is in the future, array 430 is updated for the current class at the leaf's priority. When that future time is reached, array 430 is again updated to reflect the allowable borrowing from that node. In order to avoid searching the entire class hierarchy at each clock tick, for any future time at which a class will again be allowed to transmit within its allocated or maximum rate, that class is identified in the timer data structure (not shown) associated with that future time. In this way, when that future time is reached, array 430 is updated according to the list for that time.

Distributed Scheduler Modules

Figure 5:
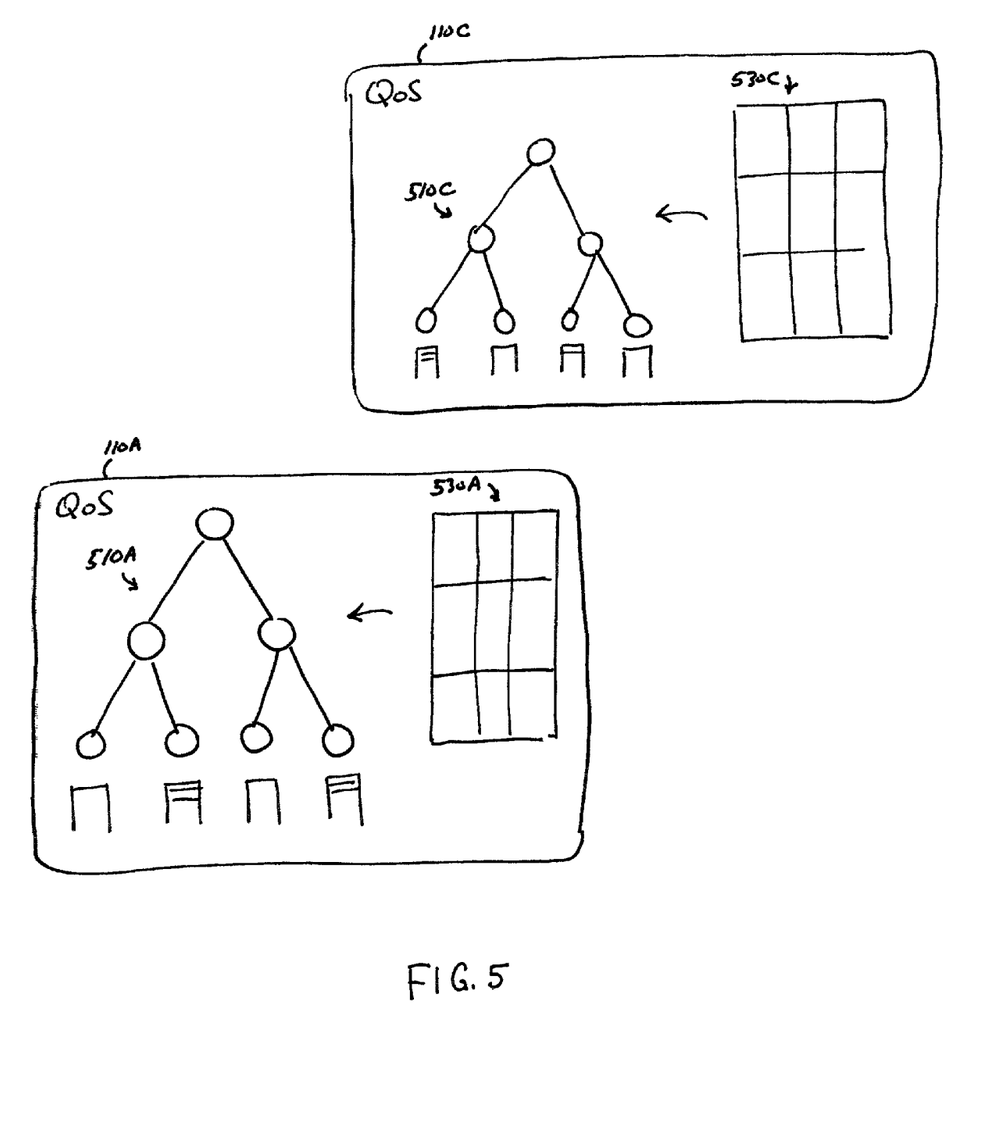
FIG. 5 is a diagram that illustrates data structures at distributed nodes.

Referring to FIG. 5, operation of the distributed scheduler modules 340 is similar to scheduler 240. Each scheduler module 340 has a copy of the class hierarchy 510. Leaf nodes have separate queues in each scheduler module 340. Also, each scheduler module 340 has a separate array 530, which is defined with respect to the corresponding class hierarchy 510 in the same way that array 430 is defined with respect to class hierarchy 410.

Initially, scheduler module 340 assigns each class an equal portion of the allocated rate and maximum rate such that the sum of the allocated rates over the separate scheduler modules is the total allocated rate for that class. That is, for N=3 scheduler modules 340A–C, each rate is ⅓ the total rate. The scheduling algorithm at each scheduling module proceeds in the same manner as the overall algorithm described above, but the next transmission times are incremented by N times as large increments reflecting the 1/N fraction of the rates allocated to each class.

Periodically, for instance once a second, or more often than once a second, scheduler modules 340 exchange demand information for each of the classes in the class hierarchy. This exchange is coordinated using atomic exchanges so that all scheduler modules can maintain a common view of the demand by each class at each node. The demand reflects past usage and queued packets for each class at each scheduler module. If all classes have exactly equal demand at each node at all times, then scheduler modules 340 do not have to update the allocated and maximum rates for the classes in the class hierarchy. Suppose however, that a particular class has 2 units of demand at scheduler 340A and 1 unit of demand at each of scheduler modules 340B–C. Then, schedulers 340A–C rebalance the allocated and maximum rate for that class to be 2/(2+1+1) =50% at scheduler 340A and 25% at each of schedulers 340B–C. The actual rates are these percentages multiplied by the rates specified by the communication policy being enforced. This rebalancing is performed for the classes at leaf nodes in the class hierarchy as well as for intermediate nodes.

Scheduler module 340 updates the classes by 1/n at a time where n is the number of nodes.

The rebalancing procedure is not allowed to reduce the allocated and maximum rates at any node below a predefined minimum to avoid long latency were that class to suddenly become relatively demanding at a node. Also, in situations in which a scheduler module 340 experiences sudden demand that exceeds its fractional share, it sends a message to the other scheduler modules to immediately relinquish the borrowed rates.

Synchronized State Information

The distributed architecture of QoS system 100 includes maintaining a communication policy across all QoS processors 110. QoS processors 110 can vary implementations of the communication policy as described above, for instance rebalancing the distribution of responsibility for classes and their related data flows among the QoS processors 110. Thus, each QoS processor 110 has state information describing its current implementation of the communication policy. QoS processors 110 exchange this state information continually over links 120, such that in general, each QoS processor 110 has full information describing the overall implementation of the communication policy, as well as the role of each QoS processor 110 in the implementation.

In embodiments that include failover capabilities, as will be described, the synchronization of state information across all QoS processors 110 enables one QoS processor 110 to assume the duties of another QoS processor 110 with minimal delay.

A first set of state information synchronized to a second set is also known as a "mirror" of the second set. Also, the act of exchanging such state information is known as "mirroring".

Because state information is shared such that all QoS processors 110 have an up to date copy, any processor has sufficient recent information, when queried, to give a reasonably accurate summary of data for the entire system.

Figure 7A:
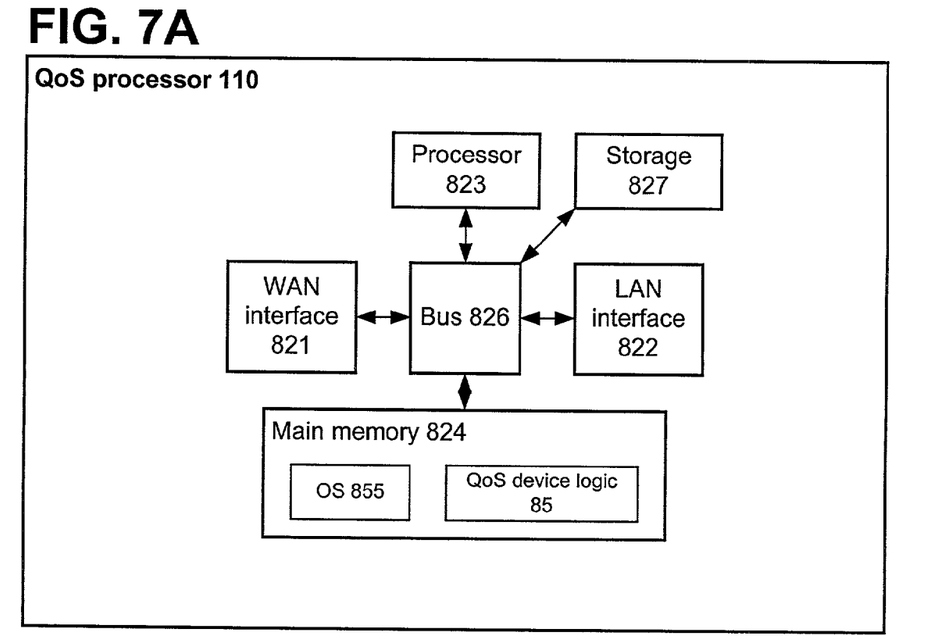
FIG. 7A is a block diagram of a quality-of-service processor.
Figure 7B:
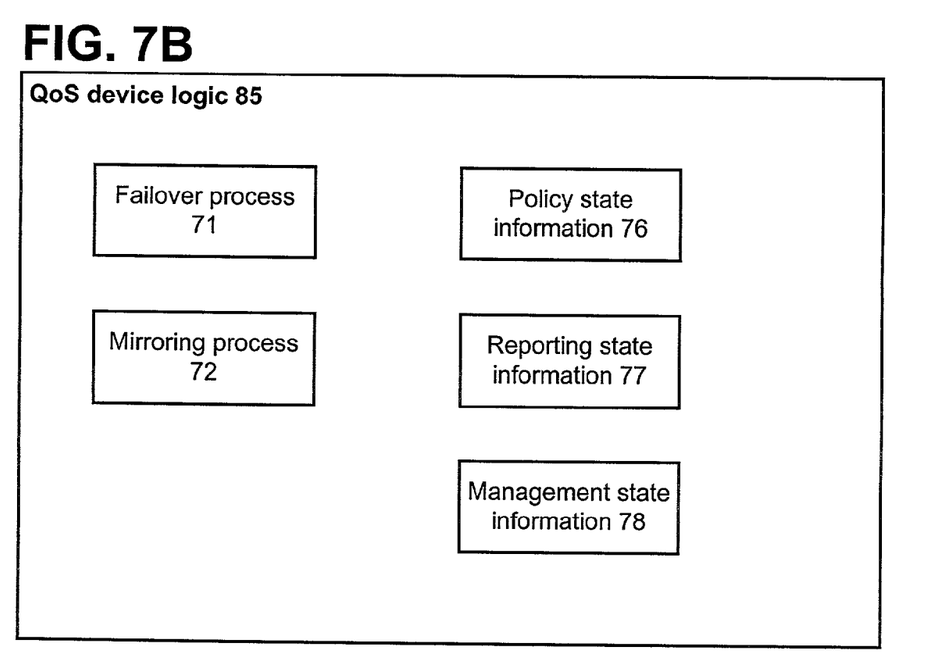
FIG. 7B is a block diagram of device logic components.

Policy state information 76 is shown in FIG. 7B.

Synchronized Reporting States

QoS processors 110 are capable of capturing statistics about data passing through QoS processors 110. The statistics include information identifying, reporting, and summarizing data flows handled by QoS processors 110. QoS processors 110 can send the collected statistics over networks. QoS processors 110 can also respond to queries about the collected statistics, such as via a MIB interface using the SNMP network protocol.

In addition to state information describing communication policy, QoS processors 110 also maintain mirrors of state information describing reports. State information includes, for example, statistics to collect, how often to collect them, and entities to which the statistics are to be reported. QoS processors 110 exchange information across links 120 to update their mirrors of state information regarding reports.

Reporting state information 77 is shown in FIG. 7B.

Synchronized Management States

QoS processors 110 are managed network devices. QoS processors 110 contain configuration parameters for management information, such as parameters configuring agents to monitor metrics on network performance and policy implementations. At least some of the management information conforms to SNMP standard MIB formats.

In addition to state information describing communication policy, QoS processors 110 maintain mirrors of state information describing management settings.

Management state information 78 is shown in FIG. 7B.

Physical Components

With regard to FIG. 7A, physical components of QoS processor 110 include WAN interface 821, LAN interface 822, processor 823, main memory 824, storage 827, and bus 826. WAN interface 821 is a network interface through which QoS processor 110 communicates over link 140. LAN interface 822 is a network interface through which QoS processor 110 communicates over link 130. Thus, traffic moving outbound on WAN interface 821 goes toward high-capacity link 142, while traffic moving outbound on LAN interface 822 goes toward high-capacity link 132. In this embodiment, WAN interface 821 and LAN interface 822 are Ethernet network interfaces capable of 10/100 Mbps. (Note: the terms "WAN" and "LAN" in WAN interface 821 and LAN interface 822 are illustrative of this embodiment. Other embodiments need not involve a WAN/LAN distinction.)

Main memory 824 includes software code, i.e., machine-readable instructions for performing the functions of QoS processor 110, including operating system 855. Processor 823 executes these instructions, accessing main memory 824 via bus 826. Bus 826 also connects WAN interface 821, LAN interface 822, and storage 827. Storage 827 is a non-volatile storage device. In this embodiment, storage 827 is a hard disk drive containing at least 10 Gb of storage.

In this embodiment, operating system 855 is based on a Free BSD Unix kernel. Portions of operating system 855 also reside in storage 827.

A commercially available example of QoS processor 110 is QoSArray, sold by Sitara Networks, 52 Second Avenue Suite 200, Waltham, Mass. 02451, USA.

Dual Processor Embodiment

A second embodiment will now be described, in which two processors support a QoS system with high availability.

Figure 8A:
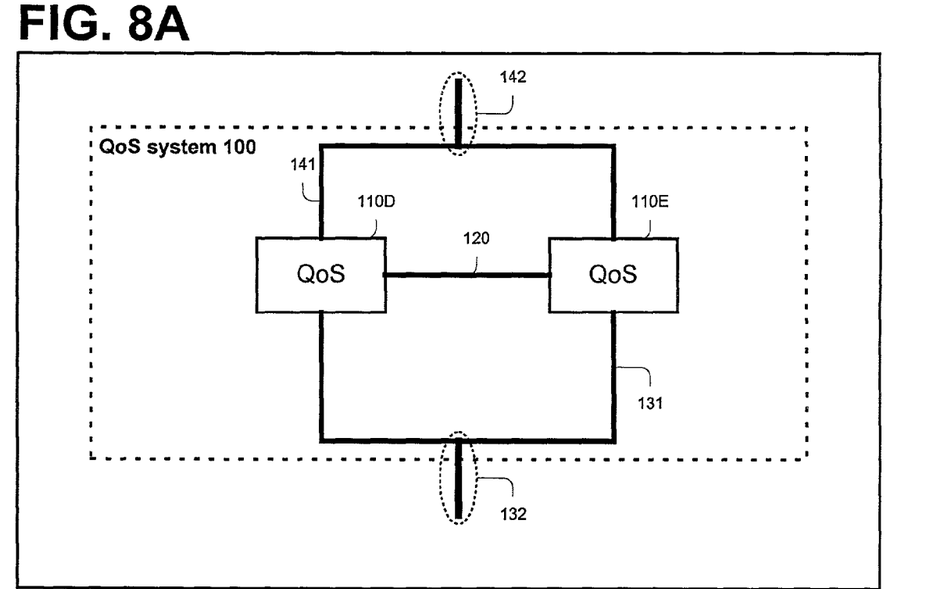
FIG. 8A is a block diagram of a dual-processor system.

Referring to FIG. 8A, distributed QoS system 100 is a gateway system connecting high-capacity link 132 to high-capacity link 142 via network segments 131 and 141, respectively. Network traffic travels from high-capacity link 132 to high-capacity link 142, and vice versa, across QoS system 100. Network segments 131 and 141 may use a different physical or logical network medium than high-capacity links 132 or 142, respectively. If so, an appropriate network device (not shown) such as a bridge or switch can pass layer-three traffic between the media. For example, high-capacity link 142 might be a link to a frame relay network, joined to a high-speed Ethernet network segment 141 by a CPE gateway (not shown).

Note that network segments 131 and 141 might not be segments in every formal sense, for instance if a network device is installed that divides a "segment" into several collision domains. Conceptually, however, network segments 131 and 141 can pass network traffic between high-capacity links 132 and 142 to QoS processors 110.

QoS system 100 includes identically configured QoS processors 110D and 110E, coupled to one another over communication link 120. QoS processors 110 each have a network interface for each of network segments 131 and 141. In this embodiment, one QoS processor 110, for example QoS processor 110D, is designated "active" while QoS processor 110E is designated "standby". Active QoS processor 110D passes network flows, and processes QoS policies, as described in the first embodiment.

Referring to FIG. 7B, QoS device logic 85 (shown in FIG. 7A) includes failover process 71 and mirroring process 72. Standby QoS processor 110E uses mirroring process 72 to keep its logical processing modules in the same states as their counterparts on active QoS processor 110D. Mirroring process 72 continually updates the module states by exchanging messages over communication link 120. Standby QoS processor 110E therefore provides all the capabilities of active QoS processor 110D, including QoS policy and reporting, in case of a failure of active QoS processor 110D. This arrangement provides high availability via failover process 71.

As part of its standby status, standby QoS processor 110E keeps its network interfaces 821 and 822 (shown in FIG. 7A) in a shut down state until such time as QoS processor 110E becomes active.

Note that in this embodiment, unlike in the first embodiment, for two QoS processors 110 configured for high availability, the aggregation/disaggregation devices of FIG. 1 are not required. In other respects, QoS processors 110 and communication link 120 have the same features as described in the first embodiment.

Failover Process

Figure 8B:
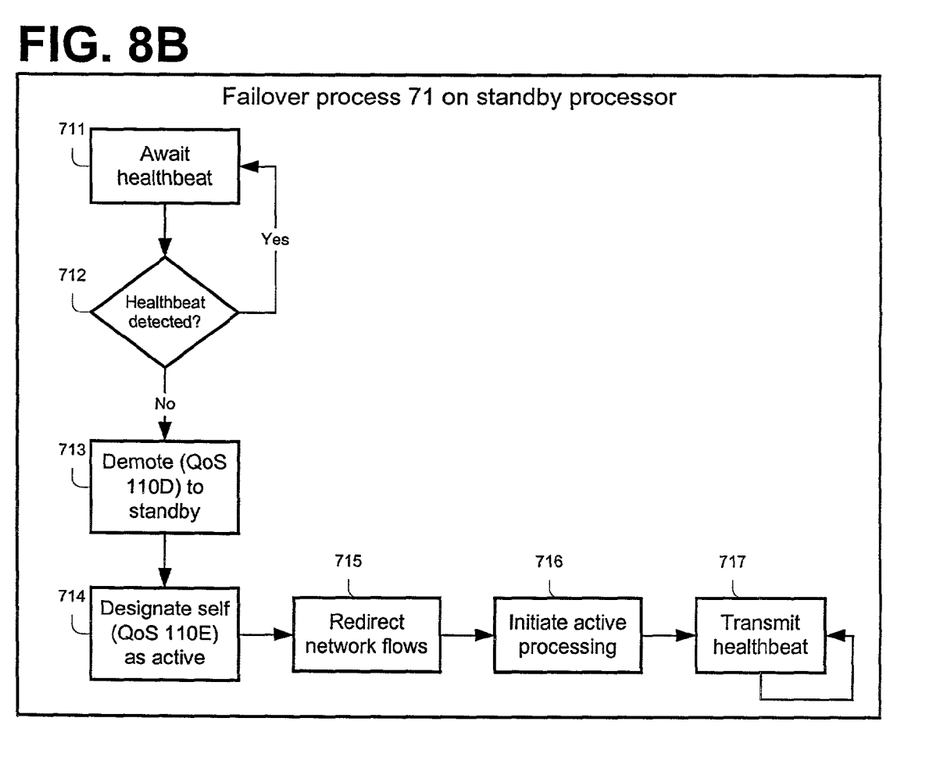
FIG. 8B is a flowchart of a failover process.

Referring to FIG. 8B, standby QoS processor 110E runs failover process 71. Failover process 71 awaits "healthbeat" messages from active QoS processor 110D (step 711). If after a predetermined period QoS processor 110D fails to transmit a healthbeat message successfully (step 712), failover process 71 re-designates QoS processor 110D from "active" to "standby" (step 713), pending correction of whatever condition caused QoS processor 110D to cease transmitting healthbeat messages. After correcting the failure condition, an administrator can reconfigure QoS processors 110D and 110E to their initial states.

Failover process 71 next designates QoS processor 110E as the active processor (step 714). Network flows that had been directed to former active QoS processor 110D (in this example) are redirected to current active QoS processor 110E (step 715). For instance, QoS processor 110D when it detects its own failure state, or by default in the case of a system crash, can shut down its network interfaces 821 and 822 (shown in FIG. 7A). Failover process 71 activates network interfaces 821 and 822 (i.e., removes them from the shut down state associated with standby status) on current active QoS processor 110E. Network flows on network segments 131 and 141 then adapt such that QoS processor 110E receives traffic formerly bound for QoS processor 110D.

Additionally, in such cases where a network device is guiding traffic over network segments 131 and 141 to specific interfaces, failover process 71 can communicate with the network device to specify how network flows should be redirected. Furthermore, for instance where the network device implements a spanning tree algorithm, initial path measures can be configured such that the path to QoS processor 110D is of lower cost (in the spanning tree algorithm) than the path to QoS processor 110E. Then, when the network interfaces 821 and 822 of QoS processor 110D shut down, the network device will detect the shut-down and redirect traffic along the current least-cost path, i.e., to QoS processor 110E.

Failover process 71 then initiates active processing on QoS processor 110E as the active processor (step 716). Finally, failover process 71 begins a loop (step 717) in which QoS processor 110E transmits healthbeat messages to new standby QoS processor 110D.

Mesh Embodiment

A third embodiment will now be described, in which multiple processors support a QoS system with a mesh arrangement of links within the QoS system.

Figure 9:
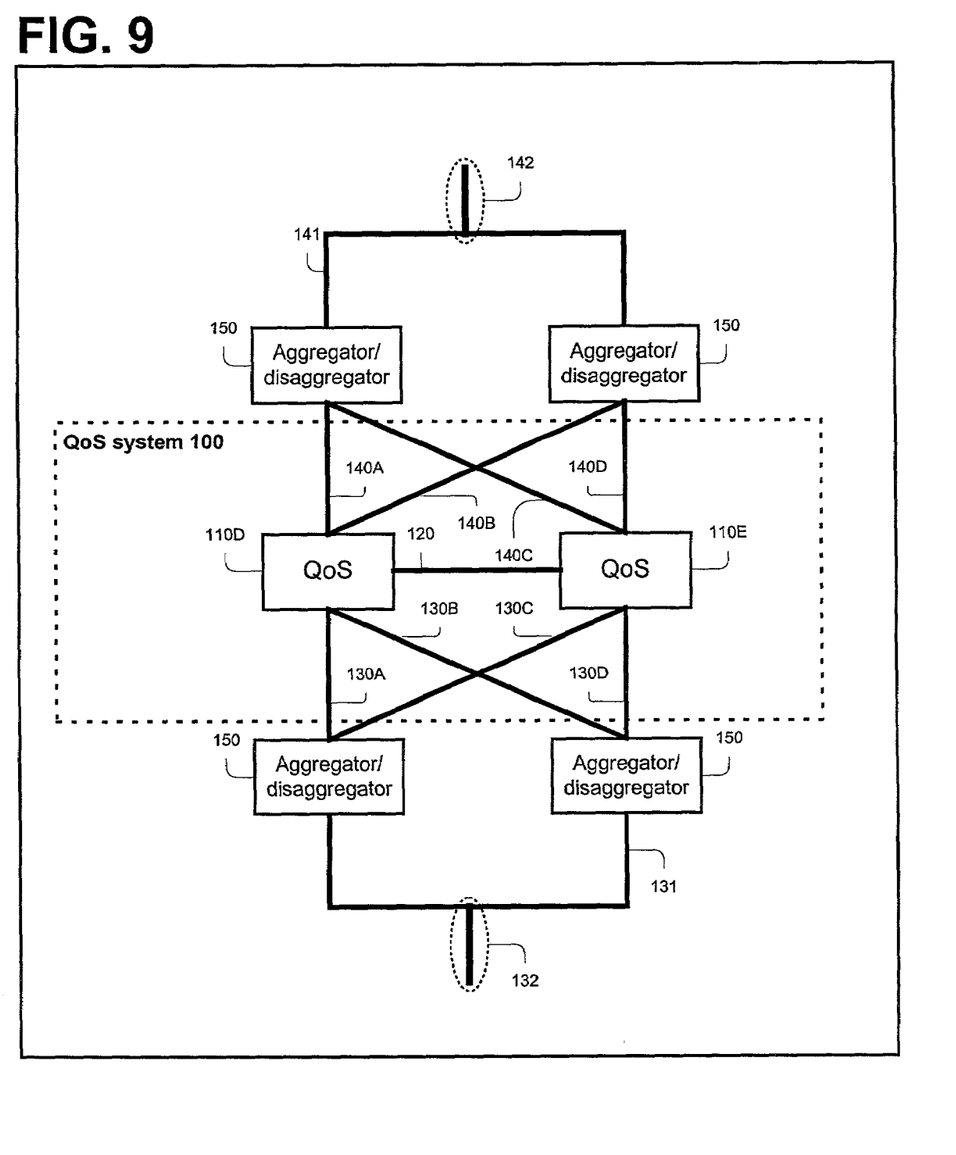
FIG. 9 is a block diagram of a multiple-processor system with mesh.

Referring to FIG. 9, distributed QoS system 100 is a gateway system connecting high-capacity link 132 to high-capacity link 142 via network segments 131 and 141, respectively. Network traffic from high-capacity link 132 to high-capacity link 142, and vice versa, cross QoS system 100. Network segments 131 and 141 are equivalent to the elements of the same name in FIG. 8A, except that they connect to aggregator/disaggregators 150 rather than directly to QoS processors 110.

QoS system 100 includes multiple QoS processors 110. As illustrated in FIG. 9, QoS system 100 includes two such QoS processors 110 for simplicity of explanation, but additional processors 110 are permissible. To each QoS system 100 there corresponds at least four aggregator/disaggregators 150: two for traffic on the same side of QoS system 100 as high-capacity link 132, and another two for traffic on the same side of QoS system 100 as high-capacity link 142. In other words, traffic passing between QoS system 100 and high-capacity link 132 traverses the former category of aggregator/disaggregators 150, while traffic passing between QoS system 100 and high-capacity link 142 traverses the latter category of aggregator/disaggregators 150.

Following earlier conventions and in the interest of clear explanation, in this discussion high-capacity link 132 defines a "LAN" side of QoS system 100, while high-capacity link 142 defines a "WAN" side, without requiring that a local area network or wide area network be present.

In this embodiment, each network QoS processors 110 has a logical connection 130 to each aggregator/disaggregator 150 on the LAN side, as well as a logical connection 140 to each aggregator/disaggregator 150 on the WAN side. Thus, for N number of QoS processors 110, QoS system 100 includes a collection of (M×N) links 130, and another collection of (P×N) links 140, where M is the number of aggregator/disaggregators 150 on the LAN side and P is the number of aggregator/disaggregators 150 on the WAN side. Note that M and P are usually equal to two but can be greater than two. Moreover, M need not equal P. Note also that links 130 and 140 need not be physical but can be logical network connections on a shared-access network, such as Ethernet.

In general, except as stated otherwise, elements of this embodiment function as described in the first embodiment.

Dual Redundant Embodiment

A fourth embodiment will now be described.

Figure 6:
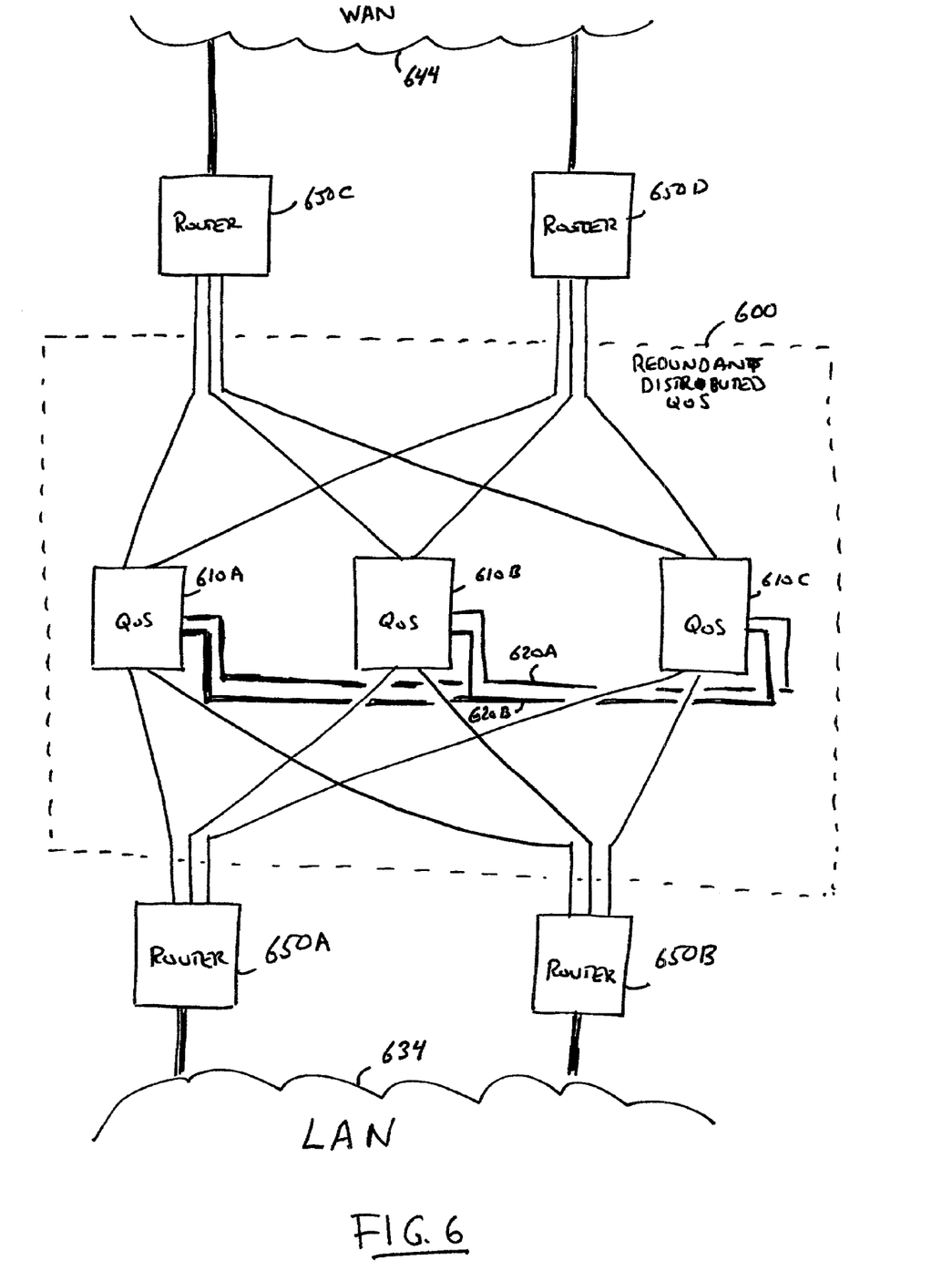
FIG. 6 is a block diagram of a dual-redundant system.

Referring to FIG. 6, a dual redundant QoS system 600 couples a local area network 634 and a wide area network 644. QoS processors 610A–610C are similar to QoS processors 110A–110C described in the first embodiment. In this embodiment, QoS processors 610 are coupled by dual redundant networks 620A–620B. QoS system 600 is coupled to LAN 634 through routers 650A–650B and to WAN 644 through routers 650C–650D. Each QoS processor 610A–610C is directly connected to each of routers 650.

At each QoS processor 610, packets are scheduled to pass through routers 650C–D in a fair manner. The links passing from each of these routers to WAN 644 may have separate policies, resulting in two instances of the scheduling algorithm to be implemented at each QoS processor, one for each link.

In general, except as stated otherwise, elements of this embodiment function as described in the first embodiment.

Alternate Embodiments

A number of embodiments of the invention have been described. Nevertheless, it will be understood that various modifications may be made without departing from the spirit and scope of the invention. For example, useful variations of this system may be constructed where links 132 or 152 or both are not aggregated, or there are additional links beyond links 132 and 152 that connect to additional or redundant equipment, or both.

QoS system 100 can be deployed at a number of different points in a communication network.

In FIG. 1, trunks of three physical links are illustrated. However, it should be understood that two, and four or more physical links can be used in related embodiments of the invention. For instance, in an embodiment in which two 100 Mb/s Ethernet links are used in each of trunked link 130 and 140, high capacity links 132 and 142 can be 155 Mb/s optical OC3 communication links.

Although FIG. 1 illustrates communication links 120 forming a fully connected network, in alternative embodiments, a multiple access network such as an Ethernet network, or any non-blocking switching fabric, may be used to couple the QoS processors.

Regarding FIGS. 4A–B, a described embodiment uses lists and arrays. Other data structures may be used as appropriate considering efficiency in time, space, or other engineering evaluation. These structures could be B-trees, hash tables, etc.

Regarding FIG. 5, rebalancing may be performed in a piecewise, progressive, or approximate manner to prevent instability or provide other useful results. Other algorithms such as exponential rolloff, digital filtering of historical demand, etc. may be used.

Accordingly, other embodiments are within the scope of the following claims.

What is claimed is:

1. A communication system for implementing an overall communication policy comprising:
   a first communication interface for accepting a first plurality of separate communication links forming a first trunked communication link;
   a second communication interface for accepting a second plurality of separate communication links forming a second trunked communication link; and
   a plurality of processors, each coupled to a corresponding different one of the first plurality of separate communication links and coupled to a corresponding different one of the second plurality of communication links, and coupled to one another over a communication channel;
   wherein each processor in the plurality of processors is configured to implement a separate communication policy for data passing between one of the first plurality of communication links forming the first trunked communication link and a corresponding one of the second plurality of communication links forming the second trunked communication link, such that together the separate communication policies approximate the overall communication policy,
   wherein the plurality of processors are further configured to communicate among one another to adjust the separate communication policies to adapt to data flows passing through the processors,
   wherein each processor in the plurality of processors has a copy of each communication policy in the communication system and communicates with the other processors in the plurality of processors to keep state information current for each such copy, and
   wherein the plurality of processors is divided into a plurality of active processors and a plurality of standby processors, such that each processor in the plurality of active processors actively implements a communication policy on data, while a standby processor in the plurality of standby processors monitors the plurality of active processors for a failure on an active processor, and upon detecting the failure the standby processor joins the plurality of active processors, thus implementing the overall communication policy.

2. The system of claim 1, wherein adapting to data flows includes a first processor in the plurality of processors borrowing bandwidth from a second processor in the plurality of processors.

3. The system of claim 1, wherein each processor in the plurality of processors mirrors state information for reporting across the communication system.

4. The system of claim 1, wherein each processor in the plurality of processors mirrors state information for management across the communication system.

5. The system of claim 1, wherein the overall communication policy is only implemented for traffic traveling from the first interface to the second communication interface.

6. The system of claim 1, wherein the overall communication policy is implemented for traffic traveling between the first interface and the second communication interface in either direction.

7. A communication system for implementing an overall communication policy comprising:
   a first communication link;
   a second communication link;
   a plurality of processors, each processor in the plurality of processors configured to implement the communication policy for data passing between the first communication link and the second communication link;
   a first plurality of aggregator/disaggregator network devices arranged between the plurality of processors and the first communication link;
   a second plurality of aggregator/disaggregator network devices arranged between the plurality of processors and the second communication link;
   a first mesh, including a plurality of network links such that a link in the plurality of network links exists to join each processor in the plurality of processors to each aggregator/disaggregator in the first plurality of aggregator/disaggregator network devices; and
   a second mesh, including a plurality of network links such that a link in the plurality of network links exists to join each processor in the plurality of processors to each aggregator/disaggregator in the second plurality of aggregator/disaggregator network devices;
   wherein each processor in the plurality of processors is configured to implement a separate communication policy for data passing between the first communication link via a first aggregator/disaggregator in the first plurality of aggregator/disaggregator network devices and the second communication link via a corresponding one of the second plurality of aggregator/disaggregator network devices, such that together the separate quality-of-service policies approximate the overall communication policy,
   wherein the plurality of processors are further configured to communicate among one another to adjust the separate communication policies to adapt to data flows passing through the processors, and
   wherein the plurality of processors is divided into a plurality of active processors and a plurality of standby processors, such that each processor in the plurality of active processors actively implements a communication policy on data, while a standby processor in the plurality of standby processors monitors the plurality of active processors for a failure on an active processor, and upon detecting the failure the standby processor joins the plurality of active processors, implementing a communication policy on data previously associated with the active processor.

8. The system of claim 7, wherein each processor in the plurality of processors has a copy of each communication policy in the communication system and communicates with the other processors in the plurality of processors to keep state information current for each such copy.

* * * * *